United States Patent [19]

Ogasawara

[11] Patent Number: 4,695,150
[45] Date of Patent: Sep. 22, 1987

[54] DIAPHRAGM-CONTROL APPARATUS FOR CAMERA

[75] Inventor: Akira Ogasawara, Kawasaki, Japan

[73] Assignee: Nippon Kogaku K. K., Tokyo, Japan

[21] Appl. No.: 909,462

[22] Filed: Sep. 19, 1986

[30] Foreign Application Priority Data

Sep. 20, 1985 [JP] Japan .................................. 60-208474

[51] Int. Cl.$^4$ ............................................. G03B 7/095
[52] U.S. Cl. ..................................................... 354/448
[58] Field of Search ............... 354/435, 446, 448, 451, 354/453, 455, 270, 271.1

[56] References Cited

U.S. PATENT DOCUMENTS

| 2,307,948 | 8/1943 | Phillips | 309/12 |
|---|---|---|---|
| 4,269,497 | 3/1981 | Ishizaka et al. | 354/286 |
| 4,288,150 | 9/1981 | Ogasawara | 354/448 |
| 4,307,948 | 12/1981 | Kitamura et al. | 354/448 |
| 4,322,145 | 3/1982 | Yamada et al. | 354/435 |
| 4,396,271 | 8/1983 | Hiraike | 354/271.1 |
| 4,600,289 | 7/1986 | Maida et al. | 354/448 |

Primary Examiner—W. B. Perkey
Attorney, Agent, or Firm—Shapiro and Shapiro

[57] ABSTRACT

A diaphragm-control apparatus for controlling stopping-down of an aperture of a photographing lens for a camera to obtain a desired aperture value includes light metering means for detecting an intensity of light reflected by an object to be photographed and transmitted through the aperture and sequentially generating electrical signals each corresponding to a detected light intensity, memory means for storing a predetermined number of electrical signals, storing means for sequentially storing the electrical signals in the memory means. The storing means is adapted to store the electrical signal in place of an oldest electrical signal stored in the memory means. The apparatus further includes operating means for sequentially calculating changing velocities represented by the electrical signals during stopping-down according to the predetermined number of electrical signals stored in the memory means. The operating means is adapted to sequentially calculate a predicted electrical signal to be produced by the light metering means after a lapse of a predetermined period of time from a time corresponding to a newest electrical signal stored in the memory means, according to a corresponding one of calculated changing velocities, and stopping means for detecting that a value represented by the predicted electrical signal calculated by the operating means has a predetermined relationship with the desired aperture value, and for interrupting the stopping-down.

3 Claims, 10 Drawing Figures

| | |
|---|---|
| POINTER 1 | |
| $a_0$ | $X_0$ |
| $a_1$ | $X_1$ |
| $a_2$ | $X_2$ |
| | ⋮ |
| $a_{m-1}$ | $X_{m-1}$ |
| | |
| | |
| POINTER 2 | |
| $b_0$ | $Y_0$ |
| $b_1$ | $Y_1$ |
| $b_2$ | $Y_2$ |
| | ⋮ |
| $b_n$ | $Y_n$ |

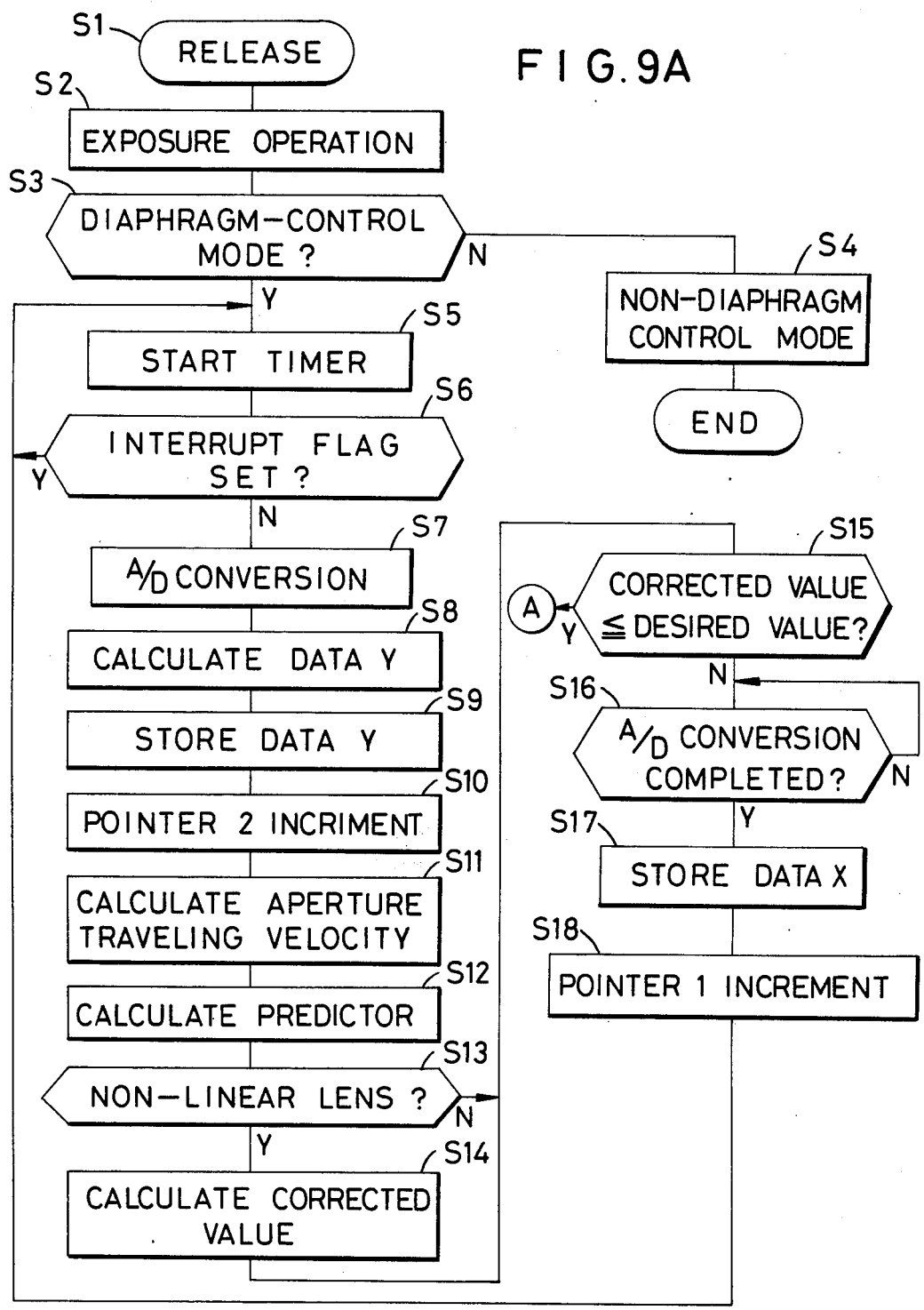

DIAPHRAGM-CONTROL APPARATUS FOR CAMERA

BACKGROUND OF THE INVENTION

1. Field of the Invention

The present invention relates to a diaphragm-control apparatus for a camera.

2. Related Background Art

A typical example of a conventional diaphragm-control system is described in U.S. Pat. No. 4,307,948. According to this system, changes in light metering value output upon changing of an aperture value are detected. A diaphragm or aperture stopping signal is generated to interrupt stopping-down of the aperture when the measured light metering value reaches a desired aperture value.

A conventional diaphragm-control apparatus shown in FIG. 1 will be described below. Light passing through a photographing lens is photoelectrically converted by a photodiode PD as a light metering sensor in the camera body. A current from the photodiode PD is converted into a voltage logarithmically compressed by a negative feedback diode D of a light metering amplifier OP1. An output $V\alpha$ from the light metering amplifier OP1 is decreased when the size of an aperture or stop St is stopped down. When the output $V\alpha$ is compared with a voltage Vref corresponding to the desired aperture value and reaches the voltage Vref, the aperture stopping signal is output to interrupt stopping-down of the apertures St. However, a delay time dt is required until a stopping mechanism is actually operated after the aperture stopping signal is output. For this reason, the light metering output $V\alpha$ is differentiated by a differentiator constituted by an amplifier OP2, a resistor R, and a capacitor C. An advance amount of the aperture value within the delay time is added to the light metering output $V\alpha$ to obtain an output $V\beta$. This output is input to a comparator COM. The relationship between the inputs and the output with respect to the amplifier OP2 is given as follows:

$$V\beta(t) = \{1 + (CRd/dt)\}V\alpha(t)$$

If the advance amount of the aperture value within the delay time dt is converted into a value dV corresponding to the light metering output, the value dV is given by:

$$dV = CR(d/dt)V\alpha(t)$$

If the capacitance and the resistance are selected to satisfy the above equation, the change dV in light metering value within the delay time is taken into account for diaphragm control.

An output from the comparator COM serves as an aperture stopping signal to control a transistor Tr and therefore an aperture stopping magnet Mg. As a result, stopping-down of the aperture St is interrupted.

FIG. 2 is a graph showing that the output $V\alpha$ of the amplifier OP1 and the output $V\beta$ of the amplifier OP2 are reduced according to changes in stopping-down of the aperture St. As is apparent from FIG. 2, the output $V\beta$ is decreased faster than the output $V\alpha$ by a value obtained by multiplying a differential of the output $V\alpha$ with a coefficient CR. More specifically, the output $V\beta$ is a predictor of the light metering value. If the output $V\beta$ is compared with the voltage Vref corresponding to the desired aperture value, the delay time dt is taken into consideration in diaphragm control.

This conventional diaphragm-control apparatus employs analog control and requires a large number of components in practice, as shown in FIG. 1. If the diaphragm-control apparatus is integrated as an IC, the number of pins is large. Therefore, it is very cumbersome to mount such an IC on a board. In addition, since the apparatus includes a differentiator, it tends to be adversely affected, thus requiring shielding implementation in actual mounting. Furthermore, since a differential coefficient of the light metering output is used to estimate the advance amount of the aperture value within the delay time, good prediction precision can be achieved for a linear aperture travelling velocity, i.e., a predetermined gradient of the light metering output $V\alpha$. However, if the aperture is stopped down exponentially, the gradient is changed within the delay time. In this case, the longer the delay time becomes, the smaller the predictor for the advance amount of aperture value within the delay time bcomes. As a result, the resultant aperture value is larger than the desired aperture value.

SUMMARY OF THE INVENTION

It is an object of the present invention to provide a diaphragm-control apparatus for controlling an aperture value with high precision.

BRIEF DESCRIPTION OF THE DRAWINGS

FIG. 8 is a view for explaining part of the embodiment of the present invention; and FIGS. 9A and 9B are flow charts for explaining the operation of the present invention.

DETAILED DESCRIPTION OF THE PREFERRED EMBODIMENTS

Figure 1:
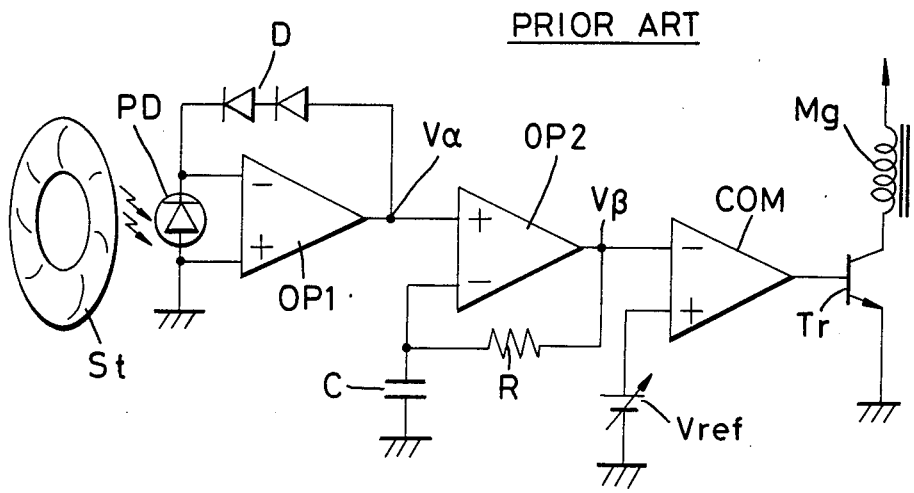
FIG. 1 is a block diagram of a conventional diaphragm-control apparatus.
Figure 2:
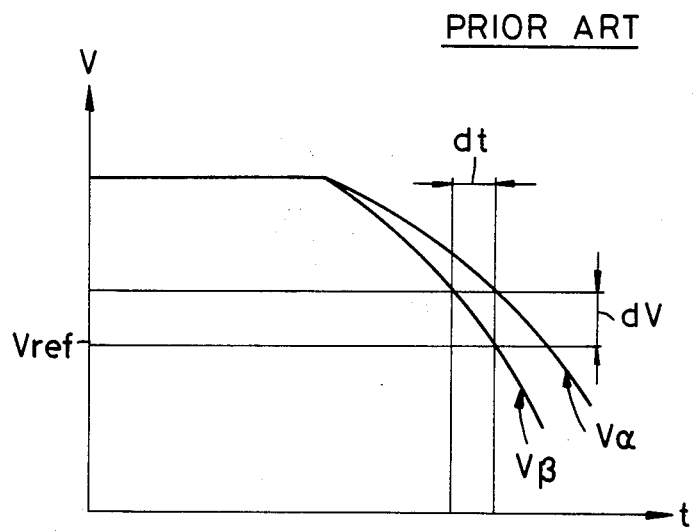
FIG. 2 is a graph for explaining the operation of the apparatus in FIG. 1.
Figure 3:
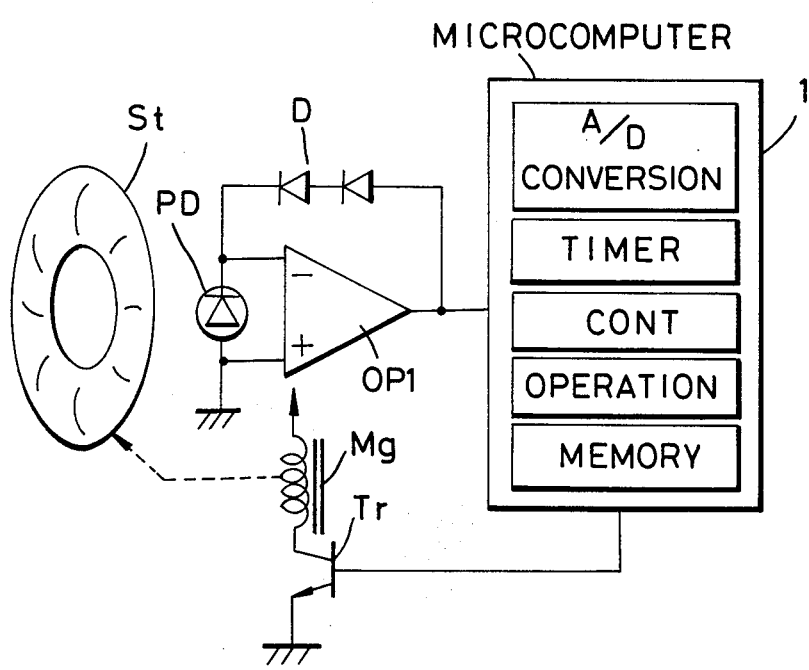
FIG. 3 is a block diagram showing part of the diaphragm-control apparatus according to an embodiment of the present invention.
Figure 4:
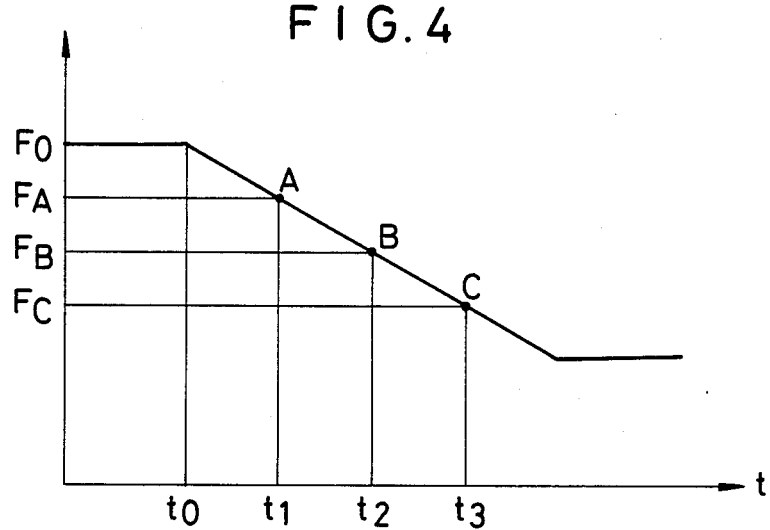
FIGS. 4, 5, 6 and 7, are graphs showing the light metering values through the aperture as a function of time.

An apparatus St and a light metering circuit (a photodiode PD, an amplifier OP1, and a diode D), a transistor Tr, and an aperture stopping magnet Mg in FIG. 3 are the same as those in FIG. 1. A light metering output from the light metering circuit is A/D-converted in a microcomputer 1 for every predetermined cycle, and the A/D-converted light metering output is digitally processed. FIG. 4 shows a decrease in light metering output according to a decrease in aperture size when the object brightness does not change. Although the graph in FIG. 4 is similar to that in FIG. 2, the reference voltage Vref plotted along the ordinate of FIG. 2 is replaced with the light metering value in FIG. 4 for the sake of simplicity. FIG. 4 shows the simplest model wherein the light metering value is linearly decreased from time t0.

The scope of the present invention will be described with reference to FIG. 4. Assume that the most recent light metering value FB is measured at time t2, and that a light metering value measured at time t1 prior to time t2 is given as FA. Under these assumptions, an aperture traveling velocity per unit time is calculated as follows:

$$(FA-FB)/(t2-t1)$$

If a delay time is defined as dt, an advance value of the aperture St within the delay time dt is given by:

$$(FA-FB)dt/(t2-t1)$$

so that a light metering value is $$FB-(FA-FB)dt/(t2-t1) \quad (1)$$

This light metering value represents a light metering value when the aperture St is actually stopped upon generation of the aperture stopping signal at time t2. The microcomputer 1 compares the light metering value corresponding to relation (1) with a desired value calculated by exposure operation and determines a timing at which the aperture stopping signal is generated to stop the aperture so as to obtain a desired light metering value. The desired value calculated by exposure operation is determined by object brightness detected prior to stopping-down of the aperture and the light metering value calculated by exposure operation.

Figure 5:
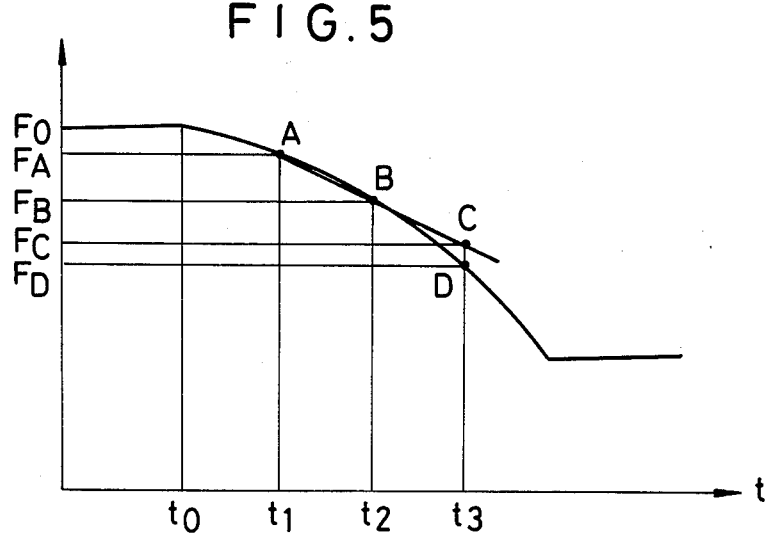

As shown in FIG. 5, however, when the aperture St travels exponentially, an accurate light metering value cannot be predicted according to the above control. A photographing lens normally has optical characteristics shown in FIG. 5. If an aperture travelling velocity is assumed to be linear, a predicted light metering value (i.e., a predictor) at time t3 lagged by a delay time is plotted as point C when this value is calculated at point B in the same manner as described above. However, an actual light metering value must be plotted as point D since the aperture travelling velocity changes exponentially. Therefore, a difference (Fc−Fd) between the light metering values at points C and D is given as a predictor error. Such an error is also present according to a compensation system using a conventional differentiator. This is because the differential coefficients (dV/dt) of the aperture travelling curve at the respective times are spontaneously changed. In practice, tangential prediction inevitably presents errors. In order to compensate such errors, a nonlinear corrected value as an aperture travelling velocity parameter is added to the linear predictor, thereby predicting the light metering value after the delay time.

Referring to FIG. 5, the light metering value (after the delay time dt=t3−t2) predicted at time t2 is defined by point C according to linear prediction as described above. By using the aperture travelling velocity (FA−FB)/(t2−t1) as a parameter, a nonlinear corrected value (Fc−Fd) between the points D and C after the delay time is calculated. The nonlinear corrected value is subtracted from the linear predicted light metering value Fc to obtain the desired light metering value Fd. If travelling curves of all interchangeable lenses are deemed to be identical, a non-linear corrected value corresponding to the identical travelling curve is prestored in a ROM. Whenever the aperture travelling velocity is calculated, the nonlinear corrected value (i.e., the experimentally measured value) is retrieved from the ROM. In other words, the nonlinear corrected value (Fc−Fd) is stored in the ROM in the microcomputer 1 of FIG. 3 using the aperture travelling velocity (FA−FB)/(t2−tl) as a parameter.

If the aperture travelling curves of all the interchangeable lenses cannot be represented by a single travelling curve, the aperture travelling curves of the lenses are classified into several groups, and the corresponding travelling curves are stored in the ROM in the microcomputer 1. A proper aperture travelling curve is selected upon discrimination of the type of interchangeable lens attached to the camera body.

Another problem must also be taken into consideration. Noise generated by an electrical circuit inside the camera body is mixed in a light metering output which inherently includes a noise component. Errors occur in aperture value calculation because of these noise components.

Referring to FIG. 5, light metering values including noise components at points A and B are A/D-converted to digital signals. In addition to a metering error in the newest light metering value FB, since the aperture travelling velocity is calculated according to a difference (FA−FB), the velocity is influenced by a metering error of the value FA. The calculation precision of (FB−Fc) and (Fc−Fd) is degraded. As a result, diaphragm-control precision is thus degraded. In order to decrease the influence of the noise component included in the light metering output, a filter having a proper time constant is inserted in a conventional diaphragm-control system with a differentiator to remove a high-frequency component from the light metering output. According to this conventional system, only high-frequency noise is attenuated without changing the response time of the light metering amplifier with respect to changes in aperture. However, it is very difficult to select an accurate time constant when the delay time of the filter is taken into consideration. In addition, the number of components is increased. However, according to another embodiment (to be described later) of the present invention, the A/D converted light metering value is filtered by software, thereby reducing the influence of the noise. This software filtering will be described with reference to FIG. 6.

Figure 6:
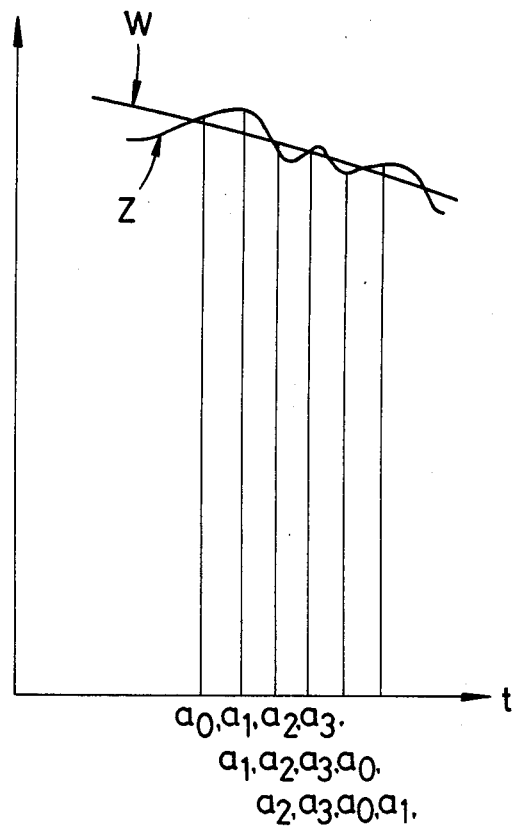

Referring to FIG. 6, a curve Z represents a light metering output including noise, and a curve W is an ideal light metering output without noise. In this embodiment, four succeeding light metering values are added and averaged. More specifically, when a new light metering value is A/D-converted, the digital light metering value is added to the three previous light metering values to obtain an average value thereof. The A/D-converted light metering value is referred to as light metering data hereinafter. Whenever a new light metering value indicated by the curve Z in FIG. 6 is A/D-converted, previous light metering data is memory celles a0, a1, a2, and a3 of the RAM in the microcomputer 1 are updated to new light metering data in an order of older data. More specifically, data are updated to be (a0, a1, a2, a3), (a1, a2, a3, a0), (a2, a3, a0, a1), . . . The four newest light metering data are averaged to obtain single average light metering data.

Figure 7:
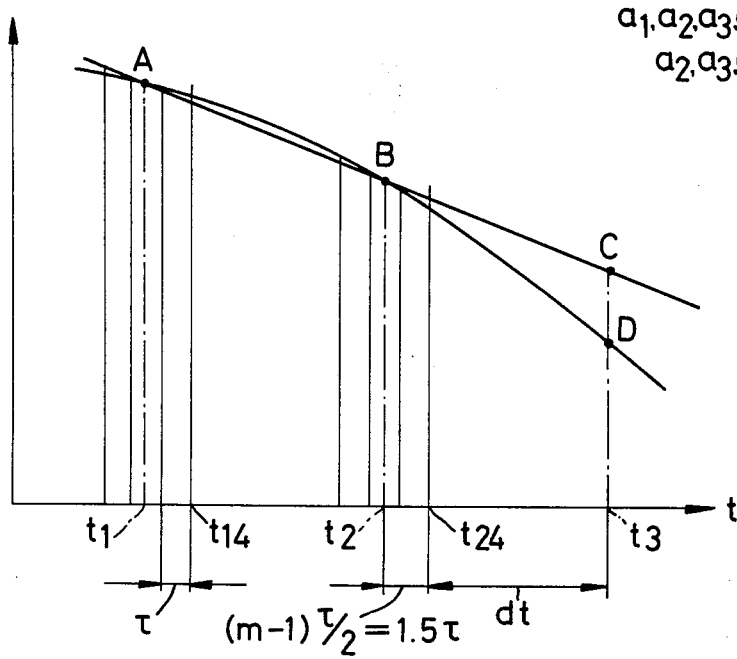

According to the above software filtering using an average value, a filter output calculated at given time corresponds to that calculated at predetermined previous time in the following manner. As shown in FIG. 7, the number of light metering data to be added and averaged is m (4 in this case). A sampling time interval of the light metering value is given as r. Times t1 and t2 corresponding to the average light metering data as outputs from the filter are prior to times t13 and t24 for the newest light metering values by $(m-1)\tau/2$. For this reason, time $(m-1)\tau/2$ is added to delay time dt for actually stopping the aperture St upon generation of the aperture stopping signal to obtain updated delay time. By using the updated delay time, the aperture position is predicted. For example, mechanical delay time dt for locking the aperture St is added to delay time $(m-1)\tau/2 = 1.5\tau$ calculated by the filter in FIG. 7. In this manner, diaphragm control is achieved in consideration of the updated delay time $(1.5_{96} + dt)$.

The sofware flow of the microcomputer 1 will be described below.

Figures 8, 9B:
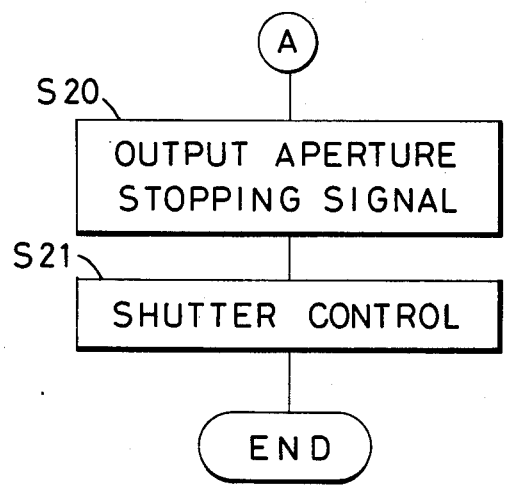

FIG. 8 shows the data storage status by pointers. Memory cells $a_0$ to $a_{m-1}$ in a RAM store light metering data, and memory cells b1 to bn in the RAM store average light metering data. Pointer 1 designates addresses of the memory cells a1 to $a_{m-1}$ and pointer 2 designates addresses of the memory cells $b_1$ to $b_n$. In the RAM, the old light metering data are sequentially replaced with new light metering data. In the case of FIG. 6, only four newest light metering data as the A/D-converted light metering values are stored. The data older than the four newest light metering data is erased. Referring to FIG. 8, four memory cells are prepared in the RAM. Every time a new light metering value is A/D-converted, the oldest data is replaced with the newest data. If the RAM has memory cells a0, a1, a2, and a3, light metering data X0 to X3 are sequentially stored in the order of $a_0$ to $a_3$. When the next new data X4 is input, the data X4 is stored in the memory cell $a_0$. Whenever new light metering data is stored, light metering data in the memory cells a0 to a3 are added and averaged. The resultant average light metering data is stored in the memory cells b0 to bn of the RAM. The number (n+1) of the memory cells b0 to bn for storing the average light metering data is the one sufficient to obtain the aperture travelling velocity. If the number (n+1) is equal to the number of data for a time interval, e.g., (t2−t1) of aperture travelling, the light metering data is periodically stored in the memory cells b0 to bn. Since the RAM is used in the manner as described above, the pointers are formed to determine the memory area of the RAM.

When the light metering values are converted into light metering data, they are sequentially stored at addresses designated by the pointer 1. Whenever the data is stored, the pointer 1 is incremented. When the pointer 1 is updated to , it is cleared to zero. In the case of FIG. 6, since m=4, the pointer is incremented to 4 and then cleared to 0.

Filtered data are sequentially stored in the filtered data in the memory cells b0 to bn using the pointer 2 in the same manner as in pointer 1. When the pointer 2 is incremented while it is , it is cleared to 0.

Referring to FIG. 7, if the number of average light metering data reaches $\{(t2-t1)/\tau\}+1$ required for the aperature travelling velocity, the velocity can be calculated by the stored average metering data. The position of point C can be predicted. In this case, the desired position of point C is actually predicted to be point D in consideration of a nonlinear corrected value. The newest average metering data represents that at point B. The pointer 2 is incremented, and the next aperture predicted position can be calculated.

If a time interval (e.g., t2−t1) is too short to detect the aperture travelling velocity, the aperture slightly travels and the change in light metering value is small to degrade the detection precision. However, if the time interval for detecting the aperture travelling velocity is too long, detection precision of the linear component can be improved. However, the nonlinear corrected value is large to result in large errors if a single nonlinear table is prepared for several interchangeable lenses. Furthermore, if the travelling curve is greatly bent, a small detection error in the aperture travelling velocity causes a large nonlinear corrected value even for a single interchangeable lens, thus posing a problem. It is desirable to shorten a time interval within the range wherein measurement precision of the aperture travelling speed is not degraded in practice.

The diaphragm-control operation under the control of the microcomputer will be described with reference to FIGS. 9A and 9B. When a user depresses a shutter release button, a release signal is generated in step S1. Stopping-down of the aperture is started after the lapse of a predetermined period of time (i.e., as soon as the operation in step S3 is completed). In step S2, exposure operation is performed using exposure factors (e.g., a time value, a speed value, and brightness value). The microcomputer 1 determines in step S3 whether the diaphragm-control mode (e.g., a program photographing mode and a shutter-priority photographing mode). If the microcomputer 1 determines in step S3 that a non-diaphragm-control mode is set, the flow advances to step S4 wherein a picture is taken. However, if the microcomputer 1 determines that the diaphragm-control mode is set, the flow advances to step S5. In step S5, a reload timer is started. Upon operation of this timer, a timer circuit incorporated in the microcomputer 1 is repeatedly operated to set the interrupt flag for every operation cycle. If a timer period is given as $\tau$, the light metering value is A/D-converted every time the interrupt flag is set. Therefore, the light metering value can be sampled at the predtermined period $\tau$.

The microcomputer 1 determines in step S6 whether the interrupt flag is set. In step S7, the light metering value is converted to light metering data X. In step S8, the light metering data X are added and averaged to obtain average light metering data Y. In step S9, the average light metering data Y is stored in one of the memory cells b0 to bn in the RAM. In step S10, the pointer 2 is incremented by one.

In step S11, the aperture travelling velocity is calculated. In association with FIG. 7, the aperture travelling velocity v is given as follows:

$$v = (YA - YB)/(t2 - t1)$$

where YB is the average light metering data at point B, and YA is the average light metering data at point A.

In step S12, the linear predictor is calculated. In association with FIG. 7, the linear predictor is obtained such that the aperture travelling velocity v obtained in step S11 is multiplied with the time interval (t3−t2), and that the product is subtracted from the average light metering data YB. That is, $$YC = YB - (YA - YB)\{(t3 - t2)/(t2 - t1)\}$$

The microcomputer 1 determines in step S13 whether the interchangeable lens is a nonlinear lens which requires a nonlinear corrected value. This decision block is performed as described in U.S. Pat. No. 4,269,497 wherein lenses are classified into a lens with a pin and a lens without a pin, and a means is arranged in the camera body to detect the presence/absence of the pin. In step S14, a nonlinear corrected value C(y) corresponding to the predictor YC is read out from a ROM and is added to the predictor YC, so that $$YD = YC + C(y)$$

In step S15, the microcomputer 1 compares the desired value calculated by exposure operation with the corrected value YD obtained in step S14. If the corrected value YD reaches the desired value, the flow advances to step S20. In this step, the aperture stopping signal is output to lock the aperture St. If the predictor is accurate, the aperture is controlled to obtain an optimal light metering value at time t3 of FIG. 7. In step S21, the shutter is released to take a picture with an optimal exposure. However, if the microcomputer 1 determines that the corrected value YD does not reach the desired value, the flow advances to step S16. After a light metering value is completely A/D-converted in step S7, the newest light metering data is stored in step S17 in one of the memory cells $a_0$ to $a_{m-1}$ which is accessed by the pointer 1. In step 18, pointer incrementation and clearing are performed in the same manner as in step S10. The flow returns to step S6, and operation is repeated until the corrected value reaches the desired value.

As is apparent from the above flow chart, the light metering values are filtered and the predictors are calculated during A/D conversion. The filter output of the light metering value is delayed with respect to a change in light metering output by time $(N-1)\tau/2$ in the description with reference to FIG. 7. However, in the flow chart of FIG. 9A, filtering is performed for the previously A/D-converted light metering data while the new light metering value is A/D-converted. In practice, a total delay time is $(n-3)\tau/2$ since a further delay of time $\tau$ is added. Therefore, the delay time of the filter output in FIG. 5 is $dt+(n-3)\tau/2$.

In the above embodiment, the nonlinear corrected value corresponding to the aperture travelling velocity is stored in the ROM. However, the object brightness value may be subtracted from the light metering value to obtain an aperture value, and the aperture value in place of the light metering value may be stored in the RAM. The predictor of the aperture value may then be calculated according to relation (1). In this case, the nonlinear corrected value corresponding to the aperture value may be stored in the ROM.

What I claimed is:

1. A diaphragm-control apparatus for controlling stopping-down of an aperture of a photographing lens for a camera to obtain a desired aperture value, including:

(a) light metering means for detecting an intensity of light reflected by an object to be photographed and transmitted through said aperture and sequentially generating electrical signals each corresponding to a detected light intensity;

(b) memory means for storing a predetermined number of electrical signals;

(c) storing means for sequentially storing the electrical signals in said memory means, said storing means being adapted to store the electrical signal in place of an oldest electrical signal stored in said memory means;

(d) operating means for sequentially calculating changing velocities represented by the electrical signals during stopping-down according to the predetermined number of electrical signals stored in said memory means, said operating means being adapted to sequentially calculate a predicted electrical signal to be produced by said light metering means after a lapse of a predetermined period of time from a time corresponding to a newest electrical signal stored in said memory means, according to a corresponding one of calculated changing velocities; and (e) stopping means for detecting that a value represented by the predicted electrical signal calculated by said operating means has a predetermined relationship with the desired aperture value, and for interrupting the stopping-down.

2. An apparatus according to claim 1, wherein said operating means comprises another memory means for storing corrected values corresponding to the changing velocities, the predicted electrical signal being corrected according to a corresponding one of the corrected value.

3. A diaphragm-control apparatus for controlling stopping-down of an aperture of a photographing lens for a camera to obtain a desired aperture value, including (a) light metering means for detecting an intensity of light reflected by an object to be photographed and transmitted through said aperture and sequentially generating electrical signals each corresponding to a detected light intensity;

(b) first memory means for storing a predetermined number of electrical signals;

(c) first storing means for sequentially storing the electrical signals in said first memory means, said storing means being adapted to store the electrical signal in place of an oldest electrical signal stored in said first memory means;

(d) second memory means;

(e) second storing means for sequentially generating average electrical signals on the basis of the predetermined number of electrical signal stored in said first memory means and for storing the average electrical signals in said second memory means;

(f) operating means for sequentially calculating changing velocities represented by the electrical signals during stopping-down according to the plurality of average electrical signals stored in said second memory, said operating means being adapted to sequentially calculate each aperture position signal representing a state of said aperture after a lapse of a predetermined period of time from a time corresponding to a newest average electrical signal stored in said second memory means, according to a corresponding one of the calculated changing velocities; and (g) stopping means for detecting that a value represented by a calculated aperture position signal has a predetermined relationship with the desired aperture value and for interrupting the stopping-down.

* * * * *